UNITED STATES PATENT OFFICE.

KARL RÜCKER AND DANIEL JACQUES PICKÉE, OF BERLIN, GERMANY.

PRESERVATIVE.

No. 12,693. Specification of Reissued Letters Patent. Reissued Sept. 3, 1907.

Original No. 784,503, dated March 7, 1905, Serial No. 201,583. Application for reissue filed June 24, 1905. Serial No. 266,899.

*To all whom it may concern:*

Be it known that we, KARL RÜCKER, chemist, a citizen of the German Empire, and DANIEL JACQUES PICKÉE, electro-engineer, a citizen of the Kingdom of the Netherlands, both residents of Greisswalderstrasse 140/141, Berlin, Germany, have invented new and useful Improvements in Preservatives, of which the following is a specification.

Our invention is a preservative compound intended to be used in the preservation of articles of food—such as fish, sausage, meat, butter, and the like—and also articles such as instruments, cigars, soap, photographic plates, and generally anything that is subject to deterioration or infection. It is particularly adapted for use on materials used for inclosing such articles, and particularly for impregnating paper, cardboard, and wooden boxes intended to receive preserved food.

It is well known that oil is a very good substance for excluding air, and therefore has excellent preserving qualities, so that it can be used direct in tins or other impervious vessels for preserving fish. Oil is, however, by itself unsuitable for preserving purposes according to this invention, as at the ordinary temperature it is too fluid and adheres to the article preserved, so that it could be used only by inclosing said article in a separate vessel.

According to this invention any suitable substance, but preferably resin, is added to the oil in order to increase its consistency—that is to say, to raise its melting-point to such an extent that at the ordinary temperatures—say not more than 50° centigrade—it would form a solid skin round the articles to be preserved. It is preferable to use a mixture of linseed-oil with colophony, shellac, or their soaps and, if desired, for flexibility wax and glycerin, say, in the following proportion: sixty per cent. linseed-oil, twenty per cent. colophony-soap, twenty per cent. shellac, to which a sufficient quantity of glycerin and wax may be added to render the skin or envelop when set sufficiently flexible.

The new preservative according to this invention differs from many other preservatives used for the same purpose and applied to food stuffs in that it does not give any unpleasant smell and taste to the articles of food and that it is not so brittle as to easily break, but, on the contrary, is so flexible as to adapt itself to the shape of the article to be preserved under all conditions of use.

The preservative can be diluted to the desired extent with any kind of oil. When it is to be used, it is first heated to make it liquid. The articles to be preserved, first packed, if desired, are dipped into the preservative, which quickly solidifies on cooling and forms a solid skin. The heating of the preservative can be carried out without affecting the food to be preserved to such an extent that it at the same time sterilizes the surface of the article to be preserved—such as, for instance, sausage, meat, or the like. This heating to a high degree is of special importance when the substance is to be used for impregnating paper, cardboard, or wooden boxes or the like intended to be used for articles of food. It is then only necessary to dip the inclosing boxes into the hot preservative and leave them there for a short time, after which they are taken out and dried, if necessary. If care is taken that the inclosing boxes thus treated are not exposed to infection, then the articles of food—such as, for instance, butter, roast beef, or other cooked and sterilized articles—can be safely put into the box in question and retained therein by means of a lid. After the articles of food are introduced the sealing is effected either by affixing to the lower end of the cover a strip dipped in the said mass and applied while the preservative is hot or by filling the joint between the cover and the box with the preservati[illegible].

The oil is preferably at first oxidized or thickened by any known processes before the shellac, resin, &c., are added. This gives it the appearance of artificial caoutchouc.

We claim:—

1. A preservative compound comprising oil, shellac, resin and wax, substantially as described.

2. A preservative compound comprising oil, shellac, resin, wax and glycerin, substantially as set forth.

3. A preservative compound consisting of more than fifty per cent. of linseed-oil, substantially equal quantities of shellac and resin, and a mixture of wax and glycerin, substantially as described.

4. A preservative compound solid at ordinary temperatures and liquid at higher temperatures, consisting of an oxidized oil and a resin-containing thickening compound, substantially as described.

5. A preservative compound consisting of an oxidized oil, thickening material mixed therewith, and a wax-like body mixed therewith to render the same sufficiently flexible, substantially as described.

6. A preservative compound comprising 60 per cent. of oxidized linseed oil, 20 per cent, of a resin-containing compound, and 20 per cent. of shellac mixed with a small percentage of wax and glycerin.

7. As a new article of manufacture, a drying oil product consisting of oxidized oil, resin, and a wax-like body, combined in such proportion that the product, when heated, will begin to soften at about fifty degrees C and becomes fully liquid as a homogeneous mass at a higher temperature, substantially as described.

In testimony whereof we have hereunto affixed our signatures in presence of two witnesses.

KARL RÜCKER.
DANIEL JACQUES PICKÉE.

Witnesses:
HENRY HASPER,
WOLDEMAR HAUPT.